INVENTORS
O. WALLACE FISHER
RALPH EDWIN WALTER
JOHN N. COOK
BY Albrecht Arnold
ATTORNEY Patented May 9, 1933

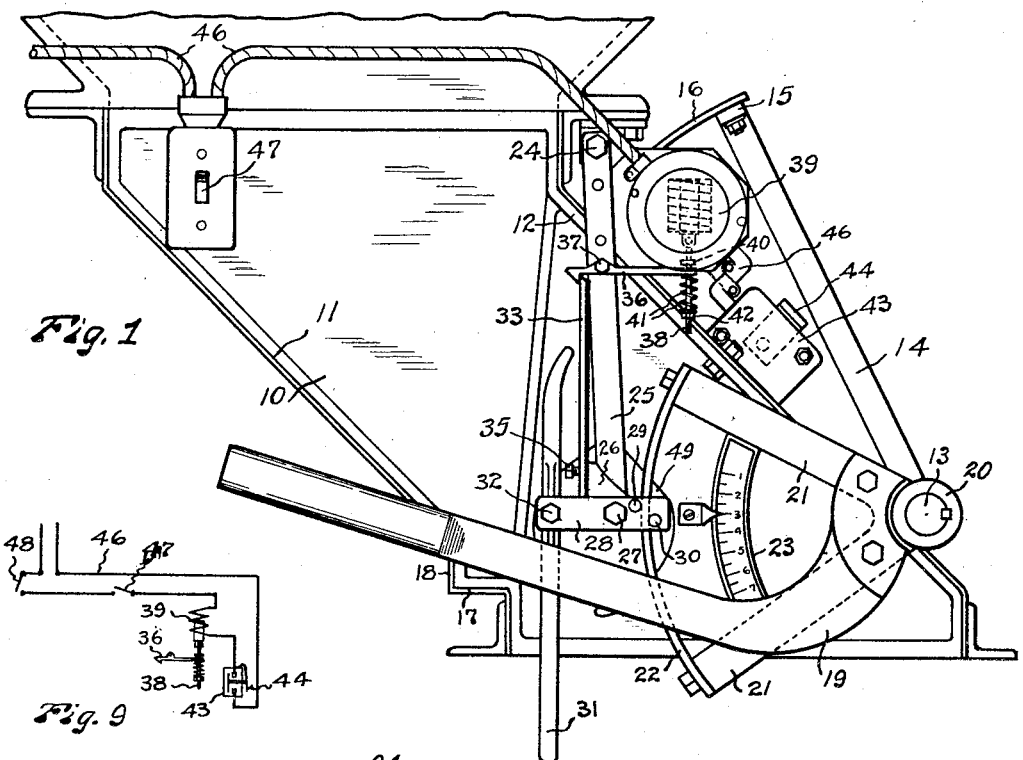
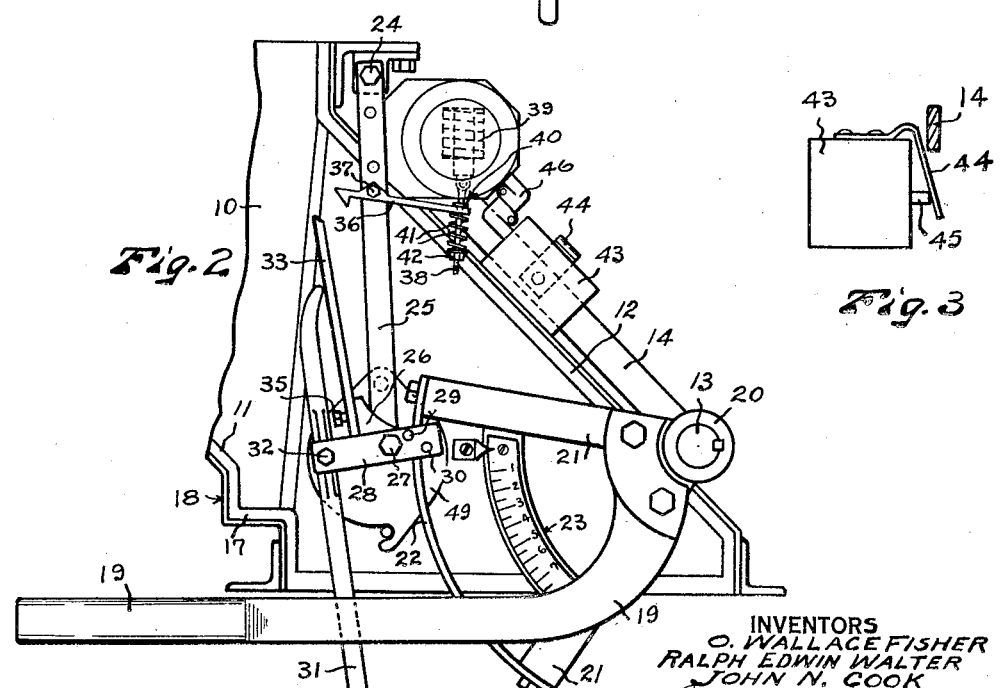

1,907,773

UNITED STATES PATENT OFFICE

ORIN WALLACE FISHER, RALPH EDWIN WALTER, AND JOHN N. COOK, OF SEATTLE, WASHINGTON, ASSIGNORS TO FISHER FLOURING MILLS CO., OF SEATTLE, WASHINGTON, A CORPORATION OF WASHINGTON

GRAIN VALVE AND MEANS FOR OPERATING THE SAME

Application filed June 10, 1930. Serial No. 460,276.

Our invention relates to grain valves for controlling the flow of grain through chutes and to means for opening and closing such valves and for retaining or holding such valves in open or partially open position.

In connection with the chutes through which grain from a storage elevator passes for delivery to a ship, railroad car or other place, it is common practice to provide such a chute with a manually-operated slide valve for the purpose of wholly shutting off the flow of grain or, by moving such valve into a partially closed position, regulating the amount of such flow. Such constructions are objectionable, not only because of the difficulty encountered in forcing a slide valve through the mass of moving grain but also because emergencies arise at times that render it necessary that the flow be shut off almost instantly and without waiting to pass the information by signal or otherwise to an attendant whose duty it is to operate such valve.

The leading objects of this invention are to provide an improved grain valve that is manually operable when such valve is to be opened to permit grain to flow down the chute and that is of such shape and so arranged relatively to the chute that during its closing movement it will very quickly and easily pass through the stream of grain to promptly shut off the flow thereof, to provide novel manually operated valve opening mechanism; to provide means in connection with such valve opening mechanism for indicating the extent of opening of the valve; to provide means for securely holding said mechanism and the valve connected therewith in different adjusted positions; to provide electrically operated means for releasing said holding means to permit the prompt closing of the valve from any of its positions; and to improve generally the construction, arrangement and operation of valves of the general character mentioned.

The above mentioned general objects of our invention, together with others inherent in the same, are attained by the device illustrated in the following drawings, the same being a preferred exemplary form of embodiment of our invention, throughout which drawings like reference numerals indicate like parts:

Figure 1 is a side elevation of a chute, and, in connection therewith, the mechanism for controlling the movements of the valve, such mechanism being shown in interlocked position and the valve in position to only partially close the chute;

Fig. 2 is a similar view of the valve controlling mechanism in the unlocked position to adapt it to be manually operated for the purpose of opening the valve in the chute, a portion only of the chute being shown;

Fig. 3 is a detail of the auxiliary means for insuring the cutting off of the current from the valve releasing mechanism as soon as the valve has been closed;

Figure 8:
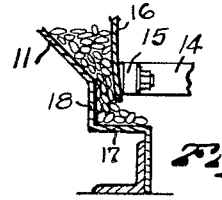
Figure 5:
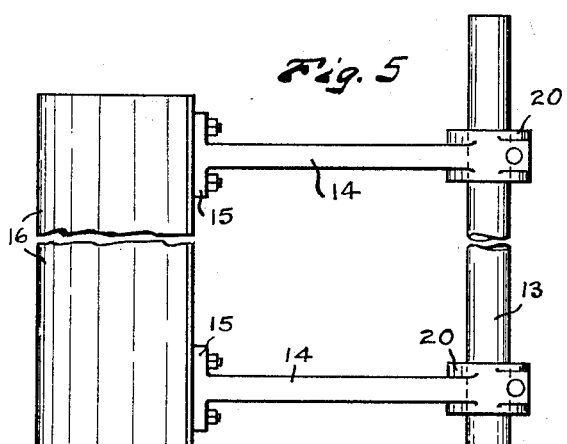
Fig. 5 is a plan view, partly broken away, of the valve, the rock-shaft to which it is connected and the lever means for rocking the shaft.

Fig. 8 is a detail, being a sectional view on a small scale illustrating the position of the valve when prevented by some foreign substance in the mass of grain from closing completely down and showing that nevertheless the escape of grain past the valve will be practically negligible; and Fig. 9 is a small scale diagram of a circuit by which, upon the opening thereof at any one of several places, the valve controlling mechanism will, if the valve in the chute is in raised position, be caused to move across and close the chute.

Figure 4:
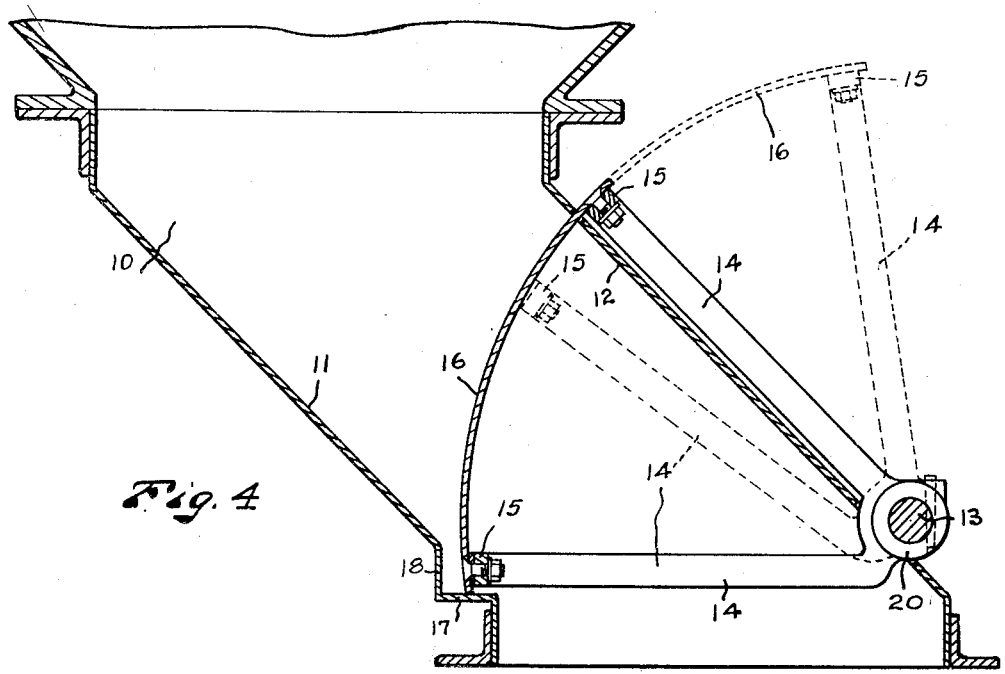
Fig. 4 is a detail in vertical section of the chute and the valve therein, the valve being also shown by broken lines in partly opened position.
Figure 6:
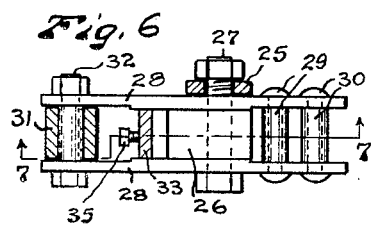
Fig. 6 is a detail, being a plan view of a rocking block that forms a portion of the means for locking the valve in any of its various adjusted positions, other portions of such means that are connected with the block being shown in horizontal section.
Figure 7:
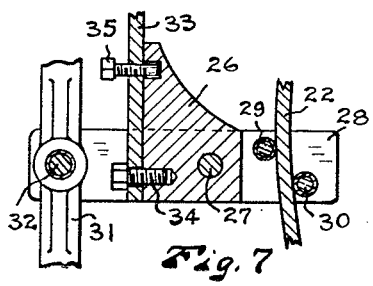
Fig. 7 is a vertical section taken substantially at the line 7—7 of Fig. 6.

Referring to the several figures of the drawings, 10 indicates an inclined chute through which grain is adapted to flow from an elevator bin to a vessel, a railroad car or other place, as usual. Preferably such chute will stand at an angle of substantially forty-five degrees. For convenience of reference in connection with other parts of the mechanism, that wall on which the grain in its descent will run is indicated by 11 and the opposite wall by 12. Opposite the wall 12 and near the lower end thereof is a rock-shaft 13 mounted in suitable bearings. Keyed or otherwise secured to the shaft are two pairs of arms 14 that at their outer ends are each formed with a head 15 shaped to adapt them to fit against and be bolted to the concave face and adjacent to the upper and lower edges respectively of a valve that is movable through a slot in the wall 12 across the chute and adapted to control the flow of grain therethrough. As clearly shown in Fig. 4, the upper arms 14 of each pair are outside of the chute and lie alongside of the wall 12 thereof when the valve is in closed position, as there indicated by full lines. The other or lower arms of each pair are within the chute, the wall 12 of the chute being cut away sufficiently opposite the shaft 13 to permit the projection therethrough of the hub portions that fit upon the shaft 13.

The valve referred to, that is secured to the arms, is indicated by 16. It is curved from its upper to its lower edge, forming an arc of a circle whose axis is coincident with the axis of the shaft 13, and it is of a width to snugly fit between the opposite side walls of the chute so as to prevent the escape of grain past its ends. Being curved as shown not only gives great strength to it that enables it to resist, without being buckled or distorted, the great pressure imposed thereon by the weight of grain held above and bearing against it, but such curved shape renders it a matter of comparative ease to force it into closed or partly closed position through a stream of grain flowing down the chute. Further effective resistance to the downward pressure of such grain by the valve is gained by locating the rock-shaft 13 close to the wall 12 of the chute and near the lower end thereof whereby during the closing movement the bars 14, and particularly those within the chute, serve to transfer the thrusting force in almost a direct line to the securely anchored rock-shaft.

Near the lower end of the wall 11 of the chute such wall is shaped to provide an approximately vertical portion 18 and a horizontal step or shelf portion 17, the part 17 being so located as to form an abutment for the lower edge of the valve 16 to strike against and rest upon when in its lowermost or closed position. This construction insures against any tendency to wedging of the valve as might be the case if it were forced down against an inclined wall and also prevents any tendency toward lifting which might take place in such a case by reason of the grain under pressure being forced between such inclined wall and the edge of the valve. Of very considerable importance also is the fact that such angular turning of the chute wall to produce this step-like construction will practically prevent the escape of grain past the edge of the valve in the event that same foreign substance passing down with the grain so obstructs the valve as to prevent its complete closing. Such a situation is attempted to be shown in Fig. 8, where the valve is stopped at a little distance above the step 17. The grain will fill the narrow passage between the valve and the vertical riser 18 of the step or shelf and rest upon such step or shelf, but practical experience has demonstrated that notwithstanding the heavy pressure exerted by the mass of grain in the chute no material amount of grain will make the right-angle turn necessary to allow it to escape past the edge of the valve.

Turning now to the means through which the movements of the valve are controlled, both manually and automatically, 19 indicates a relatively long bent lever having a cylindrical head member 20 that fits upon the rock-shaft 13 and is made fast thereto by a key or otherwise. Connected with the lever, either by being formed integral with its head member 20, or otherwise, are two similar arms 21 that diverge from such member 20 and are connected at their outer ends by an arc shaped band 22 that, as shown, is bolted at its ends to the ends of said arms. Between this arc shaped band and the member 20 is a curved plate 23 secured at its ends to said arms, such plate having scale markings on one face, and cooperating with this scale is a fixed indicating pointer or finger, that, in the construction shown, is secured to the adjacent side wall of the chute 10. This pointer and scale are adapted to show the discharge capacity of the chute by indicating the extent to which the valve has been opened, for it will be understood that a turning of the lever 19 will rock the shaft 13 and, through the arms 14, cause a movement of the valve, and as the arms 21 that carry the scale plate 23 also are moved, the pointer will successively point to the markings thereon.

Pivotally attached at 24 to the spout 10 is a bar 25 that depends close to that wall of the spout alongside of which are arranged the lever 19 and arms 21. At its lower end it is pivotally connected at 27 with a block 26, the pivotal point 27 being intermediate the ends of the block. Against each side face of the block rests a plate 28, these plates extending considerably beyond the ends of the block. The extended portions of the plates are connected together at one end by two bolts 29 and 30 that are arranged respectively adjacent to the upper and lower edges of the plates and with the uppermost bolt nearer to the block 26. Between these bolts extends the arc shaped band 22 and on account of the way these bolts are arranged relatively to each other it will be evident that in one position of the block the band 22 can be freely moved, whereas if the block be turned, such bolts can be brought into very close engagement with said band and thus form a clamp that prevents movement of the band and consequently locks the shaft 13 and parts connected therewith against movement. Preferably, the bolts have sleeves around them as shown.

Between the projecting portions of the plates 28 at the opposite end of the block is pivoted at 32 a lever 31 that extends across and is adjacent to the larger lever 19 that is connected with the rock-shaft 13. In proximity to this lever is an arm 33 made of resilient material and which, as here shown, has its lower end extending between the same projecting end parts of the plates 28 as does the lever 31. It is bolted to the block 26 at 34, and through it, at a point above the bolt, is screwed another bolt 35 which, however, is not screwed into the block but projects loosely into a hole in the block. Its purpose is to hold the spring arm against lateral turning and at the same time not interfere with the spring action of the arm when automatically released from operative position, as hereinafter described. A further function of this bolt 35 is to regulate the tension of the bar 33 and thereby correspondingly affect the said clamping action.

The block 26 and its side plates form in effect a single member having bifurcated ends, and indeed, such parts might well be made integral with each other and the device thus constructed be termed a block having end bifurcations, and for brevity the block proper and its extended side members will hereinafter be referred to as the block.

At 36 is indicated a latch bar pivotally mounted at 37 on, and extending across the pivoted bar 25, the pivot 37 being, as clearly shown in Figs. 1 and 2, much nearer one end than the other, and at such end that is near the pivot is formed an ordinary latch head adapted to engage over the upper end of the spring bar 33 and hold such spring bar as shown in Fig. 1. At its other end it has an opening through which loosely passes a short rod 38 depending from the movable element of an ordinary solenoid indicated generally by 39. Located on this rod 38 just above the latch bar is an abutment 40 in the form of a pin or washer fixed to the rod 38 which abutment by contacting the latch bar when the solenoid is deenergized will cause a turning of the latch bar to release it from engagement with the spring bar 33. On the short rod 38 is a coiled spring 41, bearing at its upper end against the latch bar and adjustably held in place by a nut 42 on the rod, the spring tending to normally hold the latch bar in operative engagement with the resilient bar 33.

The solenoid is intended to be energized at all times under normal working conditions so as to hold the valve 16 open at any predetermined degree, but to be deenergized to accomplish the prompt automatic closing of the valve, such deenergizing being caused by the opening of any one of a plurality of switches, and one of such switches being so positioned as to be automatically opened whenever the valve is brought to its fully closed position. The automatically operating switch is located in the box 43 and may be of any approved form. As here shown a spring finger 44 normally bears against a push button 45 which when pushed in will break the circuit. The box 43 is so located that when one of the valve operating arms 14 descends it will operate such switch.

The circuit is indicated generally by 46 and as shown is provided with three switches, the one just referred to that is automatically operated, another one, 47, that will be so located as to be within convenient reach of an attendant at the levers 19 and 31, and a third one 48 which is designed to be located at a distance and so as to be usable in case of any emergency that necessitates the very prompt closing of the valve 16.

With the parts in approximately the positions shown in Fig. 2 (although the inclination of the latch bar is exaggerated somewhat) the valve 16 will be in closed position. To open the valve an attendant will first raise the lever 19, of course, rocks the shaft 13 and through the arms 14 that connect that shaft with the valve will of course raise the valve. As soon as the arm 14 that is in contact with the spring finger 44 on the switch box 43 clears that finger the switch in that box will be operated and the current through the circuit will energize the solenoid.

When the lever has been raised sufficiently as indicated by the pointer on the scale plate 23—for the arms 21 that carry the scale plate turn with the lever 19—the operator locks the grain valve against movement by swinging the other lever 31 to cause its slightly turned upper end to bear against the spring bar 23 and force it into latching engagement with the latch bar 36, the beveled portions of the members 33 and 36 facilitating such engagement. As this interlocking of those two bars occurs the bifurcated block that is pivotally attached to the lower end of the bar 25 will be so swung as to cause its bolts 29 and 30 that bridge one of the bifurcations to tightly clamp between them the curved plate 22 and thereby effect a rigid locking together of the various parts of the mechanism that will not be disturbed until the circuit 46 is broken by the opening of one of the switches—and that may be done by the attendant at the levers with the switch 47 or by a person at a distance who acts in an emergency and operates the switch indicated by 48 in the diagrammatic view in Fig. 9, and of course, any accidental cutting off of the power will cause an automatic closing of the valve.

As soon as the circuit is broken by the operation of a switch or by the failure of the power the deenergizing of the solenoid 39 permits its movable element to drop, thereby eliminating the lift on the solenoid end of the latch bar. When this occurs the tension in the spring bar 33 tends to rotate the latch bar 36 around its pivot 37, due to the fact that said pivot 37 is above the line of the applied force. The weight of the lever 31 and other parts connected with the bifurcated block cause such block to turn sufficiently to release the curved band 22 from its gripping engagement with the bolts or cross-pieces 29—30, and the parts are again in position to permit the manual readjustment of the valve to any desired position within the chute.

By our invention, we provide a valve so shaped as to be moved through a mass of flowing grain in a chute with a minimum expenditure of power, thus enabling its position to be changed very readily and quickly whenever conditions may require such a change, and that is admirably adapted by reason of its shape and its location to avoid being damaged or unduly affected by the great weight of the grain that at times may bear against it. Furthermore, our invention enables a person at a distance from the chute to almost instantly shut off the flow through the chute, and thereby in an emergency avoid the discharge of a quantity of grain that would otherwise be discharged if time had to be taken to apprise an attendant near the chute of the emergency.

At 49 is indicated a pivoted plate that serves to close an opening in one of the walls of the chute, through which opening access may be had to the interior for observation purposes or for the purpose of removing any foreign object that may have entered with the grain and interferes with the free operation of the valve.

While the invention has been described as used in connection with a grain chute, it is obvious that the mechanism is applicable to chutes through which are to be passed many kinds of free flowing materials, and the claims are therefore to be construed accordingly.

Obviously, changes may be made in the form, dimensions and arrangement of the parts of our invention, without departing from the principle thereof, the above setting forth only a preferred form of embodiment.

We claim:

1. The combination with an enclosed grain chute having an opening in one wall thereof, of a curved valve, normally tending to assume a closed position, movable thereinto through said opening in the chute, said valve acting as a movable closure for said grain chute, means for moving said valve to a plurality of pre-determined positions between the fully opened and the fully closed positions in the chute, and means for thereafter locking the valve against movement in said pre-determined positions, said locking means embodying an arcuate shaped member rotated by the opening and closing of said valve, and having selectively operable means preventing its rotation, whereby the valve is selectively held in said predetermined positions, or released and permitted to move to closed position.

2. The combination with an enclosed grain chute having an opening in one wall thereof, of a curved valve, normally tending to assume a closed position, movable thereinto through said opening in the chute, said valve acting as a movable closure for said grain chute, means for moving said valve to a plurality of predetermined positions between the fully opened and the fully closed positions in the chute, means comprising a member movable with said last named means for indicating the position of the valve in the chute, and means for thereafter locking the valve against movement in said predetermined positions, said locking means embodying an arcuate shaped member rotated by the opening and closing of said valve, and having selectively operable means preventing its rotation, whereby the valve is selectively held in said predetermined positions, or released and permitted to move to closed position.

3. The combination with an enclosed grain chute having an opening in one wall thereof, of a curved valve, normally tending to assume a closed position, movable thereinto through said opening in the chute, said valve acting as a movable closure for said grain chute, a rock-shaft adjacent to such wall, arms connecting the valve with the rock-shaft, manually operated means for turning said shaft to move the valve to selective pre-determined positions, and means for thereafter locking the valve against movement in said pre-determined positions, said locking means embodying an arcuate shaped member rotated by the opening and closing of said valve, and having selectively operable means preventing its rotation, whereby the valve is selectively held in said pre-determined positions, or released and permitted to move to closed position.

4. The combination with a chute of a curved valve movable thereinto through an opening in one of the walls of the chute, a rock-shaft adjacent to such wall, arms connecting said valve with said rock-shaft, manually operated means for turning said shaft to move the valve to a predetermined position, means comprising an arc shaped band movable with said manually operated means, clamping means engageable with said band, means for forcing the clamping means into operative engagement with the band, means for maintaining such clamping position, and electrically operated means controlling said last named means whereby the valve is selectively held in said pre-determined position, or released and permitted to move to its closed position.

5. The combination with a chute of a curved valve movable thereinto through an opening in one of the walls of the chute, a rock-shaft adjacent to such wall, arms connecting said valve with said rock-shaft, manually operated means for turning said shaft to move the valve to a predetermined position, means comprising an arc shaped band movable with said manually operated means, clamping means engageable with said band, said clamping means comprising a movable block having a bifurcated portion in which is mounted two members that respectively bear against opposite sides of said band, means for turning said block to cause said members to clamp said band between them, means for maintaining such clamping engagement, and means for releasing such engagement to permit the valve to move to its closed position.

6. The combination with a chute of a curved valve movable thereinto through an opening in one of the walls of the chute, a rock-shaft adjacent to such wall, arms connecting said valve with said rock-shaft, manually operated means for turning said shaft to move the valve to a predetermined position, means comprising an arc shaped band movable with said manually operated means, clamping means engageable with said band, said clamping means comprising a movable block carrying two members that are positioned respectively at opposite sides of said band, a resilient arm secured to and rising from said arm, a latch bar adapted to engage said resilient arm, means for forcing said arm into engagement with the latch bar and at the same time causing a movement of said block to effect a clamping of its said members against said band, and electrically operated means for holding and releasing the latch bar from said resilient arm.

7. In combination a chute, a rock-shaft adjacent to one of the walls thereof, a valve in the chute movable into and out of operative position through an opening in that wall that is adjacent to said rock-shaft, an arm secured at one end to the rock-shaft and at its other end to the upper part of said valve, means for rocking said shaft to adjust said valve, and means for holding said valve locked in its different adjusted positions, said means comprising an electrically controlled member adapted by the opening of a circuit to release said locking means and thereby permit the valve to move to a closed position.

8. In combination, a chute, a rock-shaft adjacent to one of the walls thereof, a valve in the chute movable into and out of operative position through an opening in that wall that is adjacent to said rock-shaft, an arm secured at one end to the rock-shaft and at its other end to the upper part of said valve, means for rocking said shaft to adjust said valve, means for holding said valve locked in its different adjusted positions, said means comprising an electrically controlled member adapted by the opening of a circuit to release said locking means and thereby permit the valve to move to a closed position, and another member in the path of movement of said arm adapted to be contacted by the arm to open such circuit and insure its being held open during the time said valve remains closed.

9. A device of the class described, comprising a downwardly extending enclosed grain chute having an opening in one wall thereof; a grain valve movable through said opening downwardly in said chute into closed position and movable upwardly in said chute into open position, whereby the flow of a stream of grain may be interrupted; and a sealing member connected with the opposite wall of said grain chute and positioned in the path of movement of said downwardly movable valve, said sealing member having a portion extending in a plane without a downward gradient, said portion extending into the chute beyond the intersection of the path of the said grain valve and the plane in which said sealing member is positioned, whereby the direction of flow of grain between the valve and said sealing member at times when the valve is moved during the flow of the grain into substantially but not fully closed position is changed and directed in a plane without a downward gradient, thereby causing a pile-up of grain and preventing any further flow of material when the valve is substantially but not fully closed.

10. A device of the class described, comprising a downwardly extending enclosed grain chute having an opening in one wall thereof; a grain valve movable through said opening downwardly in said chute into closed position and movable upwardly in said chute into open position, whereby the flow of a stream of grain may be interrupted; a sealing member connected with the opposite wall of said grain chute and positioned in the path of movement of said downwardly movable valve, said sealing member having a portion extending in a plane without a downward gradient, said portion extending into the chute beyond the intersection of the path of the said grain valve and the plane in which said sealing member is positioned; and the said opposite wall of the grain chute having a substantially vertical portion positioned in close proximity with the lower portion of the path of the valve, whereby the direction of flow of grain between the valve and said sealing member at times when the valve is moved during the flow of the grain into substantially but not fully closed position is changed and directed in a plane without a downward gradient, thereby causing a pile-up of grain and preventing any further flow of material when the valve is substantially but not fully closed.

In witness whereof, we hereunto subscribe our names this 22 day of May, 1930.

O. WALLACE FISHER.
RALPH EDWIN WALTER.
JOHN N. COOK.